(12) United States Patent
Granite et al.

(10) Patent No.: US 7,593,875 B2
(45) Date of Patent: Sep. 22, 2009

(54) FINANCIAL SYSTEM FOR ISOLATED ECONOMIC ENVIRONMENT

(75) Inventors: Anthony Granite, New York, NY (US); Carol Lentz, New York, NY (US)

(73) Assignee: JP Morgan Chase Bank, New York, NY (US)

( * ) Notice: Subject to any disclaimer, the term of this patent is extended or adjusted under 35 U.S.C. 154(b) by 1083 days.

(21) Appl. No.: 10/386,218

(22) Filed: Mar. 10, 2003

(65) Prior Publication Data

US 2003/0220874 A1 Nov. 27, 2003

Related U.S. Application Data

(60) Provisional application No. 60/362,746, filed on Mar. 8, 2002.

(51) Int. Cl.
*G06Q 40/00* (2006.01)
(52) U.S. Cl. .................. 705/35; 705/39; 705/36 R
(58) Field of Classification Search ............. 705/39, 705/41, 35, 66, 68, 40, 26, 36 R, 37, 38, 1; 235/375, 380, 379
See application file for complete search history.

(56) References Cited

U.S. PATENT DOCUMENTS

| | | | |
|---|---|---|---|
| 3,532,543 A | 10/1970 | Nole et al. |
| 3,546,022 A | 12/1970 | Busch et al. |
| 3,806,369 A | 4/1974 | Dey et al. |
| 4,523,297 A | 6/1985 | Ugon et al. |
| 4,544,834 A | 10/1985 | Newport et al. |
| 4,482,985 A | 4/1986 | Lofberg |
| 4,582,985 A | 4/1986 | Lofberg |
| 4,634,845 A | 1/1987 | Riley et al. |
| 4,689,478 A | 8/1987 | Hale et al. |
| 4,746,787 A | 5/1988 | Okada et al. |
| 4,750,036 A | 6/1988 | Martinez |
| 4,754,418 A | 6/1988 | Hara |
| 4,766,293 A | 8/1988 | Boston |

(Continued)

FOREIGN PATENT DOCUMENTS

EP 0855659 7/1998

(Continued)

OTHER PUBLICATIONS

Kerr, Peter"Consumer Saturday, New Way to Use Bank Card" Mar. 9, 1985, New York Times, col. 1, p. 15, Sec 1.*

(Continued)

*Primary Examiner*—Kelly Campen
(74) *Attorney, Agent, or Firm*—Hunton & Williams LLP

(57) ABSTRACT

A system and method for conducting financial transactions in an isolated economic environment. The present invention includes a non-isolated financial account system based in a non-isolated environment which maintains accounts for users. A self-sufficient financial account system in the isolated economic environment maintains a representation of the account. The account in the non-isolated financial account system and the self-sufficient financial account system are synchronized using the asynchronous connection. When the asynchronous connection is not available, the self-sufficient financial account system funds the representation of the account in anticipation of a funding of the account in the non-isolated financial account system, such as a regular direct deposit of a payroll check.

12 Claims, 2 Drawing Sheets

U.S. PATENT DOCUMENTS

| | | | |
|---|---|---|---|
| 4,825,052 A | 4/1989 | Ugon et al. | |
| 4,833,048 A | 5/1989 | Dejonghe et al. | |
| 4,859,837 A | 8/1989 | Halpern | |
| 4,868,376 A | 9/1989 | Lessin et al. | |
| 4,897,533 A | 1/1990 | Lyszczarz | |
| 4,916,296 A | 4/1990 | Streck | |
| 4,922,111 A | 5/1990 | Kuwano | |
| 4,923,288 A | 5/1990 | Allen et al. | |
| 4,968,873 A | 11/1990 | Dethloff et al. | |
| 4,977,455 A | 12/1990 | Young | |
| 4,999,617 A | 3/1991 | Uemura | |
| 5,025,373 A | 6/1991 | Keyser, Jr. | |
| 5,047,614 A | 9/1991 | Bianco | |
| 5,055,662 A | 10/1991 | Hasegawa | |
| 5,080,748 A | 1/1992 | Bonomi | |
| 5,097,115 A | 3/1992 | Ogasawara et al. | |
| 5,154,731 A | 10/1992 | Winger | |
| 5,162,175 A | 11/1992 | Visco et al. | |
| 5,168,151 A | 12/1992 | Nara | |
| 5,173,589 A | 12/1992 | Diehl | |
| 5,227,614 A | 7/1993 | Danielson | |
| 5,233,654 A | 8/1993 | Harvey et al. | |
| 5,241,161 A | 8/1993 | Zuta | |
| 5,247,190 A | 9/1993 | Friend et al. | |
| 5,249,044 A | 9/1993 | Von Kohorn | |
| 5,252,815 A | 10/1993 | Pernet | |
| 5,276,311 A | 1/1994 | Hennige | |
| 5,285,278 A | 2/1994 | Holman | |
| 5,287,181 A | 2/1994 | Holman | |
| 5,317,137 A | 5/1994 | Wilkins | |
| 5,321,240 A | 6/1994 | Takahira | |
| 5,328,809 A | 7/1994 | Holmes et al. | |
| 5,340,969 A | 8/1994 | Cox | |
| 5,339,239 A | 9/1994 | Manabe et al. | |
| 5,359,183 A | 10/1994 | Skodlar | |
| 5,396,650 A | 3/1995 | Terauchi | |
| 5,399,502 A | 3/1995 | Friend et al. | |
| 5,401,827 A | 3/1995 | Holmes et al. | |
| 5,412,192 A | 5/1995 | Hoss | |
| 5,450,479 A | 9/1995 | Alesio | |
| 5,488,571 A | 1/1996 | Jacobs | |
| 5,504,664 A | 4/1996 | Ostema | |
| 5,506,394 A | 4/1996 | Plesko | |
| 5,508,731 A | 4/1996 | Kohorn | |
| 5,510,828 A | 4/1996 | Lutterbach | |
| 5,511,114 A | 4/1996 | Stimson et al. | |
| 5,512,654 A | 4/1996 | Holmes et al. | |
| 5,513,102 A | 4/1996 | Auriemma | |
| 5,516,598 A | 5/1996 | Visco et al. | |
| 5,521,363 A | 5/1996 | Tannenbaum | |
| 5,523,179 A | 6/1996 | Chu | |
| 5,523,794 A | 6/1996 | Mankovitz | |
| 5,530,235 A | 6/1996 | Stefik et al. | |
| 5,535,147 A | 7/1996 | Jacobs | |
| 5,544,246 A | 8/1996 | Mandelbaum et al. | |
| 5,559,313 A | 9/1996 | Claus et al. | |
| 5,563,948 A | 10/1996 | Diehl | |
| 5,568,441 A | 10/1996 | Sanemitsu | |
| 5,572,004 A | 11/1996 | Raimann | |
| 5,577,109 A | 11/1996 | Stimson et al. | |
| 5,582,623 A | 12/1996 | Chu | |
| 5,585,787 A | 12/1996 | Wallerstein | |
| 5,590,038 A | 12/1996 | Pitroda | |
| 5,590,197 A | 12/1996 | Chen et al. | |
| 5,594,493 A | 1/1997 | Nemirofsky | |
| 5,604,542 A | 2/1997 | Dedrick | |
| 5,613,095 A | 3/1997 | Moss et al. | |
| 5,621,787 A | 4/1997 | McKoy et al. | |
| 5,629,977 A | 5/1997 | Fonseca | |
| 5,649,118 A | 7/1997 | Carlisle et al. | |
| 5,652,602 A | 7/1997 | Fishman | |
| 5,663,766 A | 9/1997 | Sizer, II | |
| 5,664,110 A | 9/1997 | Green et al. | |
| 5,664,157 A | 9/1997 | Takahira et al. | |
| 5,672,678 A | 9/1997 | Holmes et al. | |
| 5,690,412 A | 11/1997 | Sheldon | |
| 5,710,458 A | 1/1998 | Iwasaki | |
| 5,721,781 A | 2/1998 | Deo et al. | |
| 5,727,153 A | 3/1998 | Powell | |
| 5,728,998 A | 3/1998 | Novis et al. | |
| 5,734,154 A | 3/1998 | Jachimowicz et al. | |
| 5,736,727 A | 4/1998 | Nakata | |
| 5,736,728 A | 4/1998 | Matsubara | |
| 5,744,789 A | 4/1998 | Kashi | |
| 5,751,953 A | 5/1998 | Shiels | |
| 5,760,381 A | 6/1998 | Stich et al. | |
| 5,761,624 A | 6/1998 | Mooney | |
| 5,763,862 A | 6/1998 | Jachimowicz | |
| 5,767,896 A | 6/1998 | Nemirofsky | |
| 5,770,843 A | 6/1998 | Rose et al. | |
| 5,770,849 A | 6/1998 | Novis et al. | |
| 5,777,305 A | 7/1998 | Smith et al. | |
| 5,777,306 A | 7/1998 | Masuda | |
| 5,777,903 A | 7/1998 | Piosenka et al. | |
| 5,778,067 A | 7/1998 | Jones et al. | |
| 5,789,732 A | 8/1998 | McMahon | |
| 5,789,733 A | 8/1998 | Jachimowicz et al. | |
| 5,804,806 A | 9/1998 | Haddad | |
| 5,806,044 A | 9/1998 | Powell | |
| 5,806,045 A | 9/1998 | Biorge | |
| 5,807,627 A | 9/1998 | Friend et al. | |
| 5,815,127 A | 9/1998 | Jacobs | |
| 5,815,658 A | 9/1998 | Kuriyama | |
| 5,817,207 A | 10/1998 | Leighton | |
| 5,819,234 A | 10/1998 | Slavin et al. | |
| 5,852,811 A * | 12/1998 | Atkins | 705/36 R |
| 5,854,595 A | 12/1998 | Williams | |
| 5,857,079 A | 1/1999 | Claus et al. | |
| 5,857,709 A | 1/1999 | Chock | |
| 5,859,419 A | 1/1999 | Wynn | |
| 5,864,828 A * | 1/1999 | Atkins | 705/36 R |
| 5,870,155 A | 2/1999 | Erlin | |
| 5,880,769 A | 3/1999 | Nemirofsky | |
| 5,884,271 A | 3/1999 | Pitroda | |
| 5,884,285 A * | 3/1999 | Atkins | 705/36 R |
| 5,887,271 A | 3/1999 | Powell | |
| 5,890,135 A | 3/1999 | Powell | |
| 5,920,844 A | 7/1999 | Hotta et al. | |
| 5,930,217 A | 7/1999 | Kayanuma | |
| 5,952,639 A | 9/1999 | Ohki | |
| 5,952,641 A | 9/1999 | Korshun | |
| 5,955,961 A | 9/1999 | Wallerstein | |
| 5,995,372 A | 11/1999 | Asakura | |
| 6,002,383 A | 12/1999 | Shimada | |
| 6,003,770 A | 12/1999 | Schilling | |
| 6,004,681 A | 12/1999 | Epstein et al. | |
| 6,005,183 A | 12/1999 | Akai et al. | |
| 6,011,858 A | 1/2000 | Stock et al. | |
| 6,016,954 A | 1/2000 | Abe et al. | |
| 6,019,284 A | 2/2000 | Freeman et al. | |
| 6,027,028 A | 2/2000 | Pieterse et al. | |
| 6,036,099 A | 3/2000 | Leighton | |
| 6,045,042 A | 4/2000 | Ohno | |
| 6,047,067 A | 4/2000 | Rosen | |
| 6,049,463 A | 4/2000 | O'Malley et al. | |
| 6,064,988 A | 5/2000 | Thomas | |
| 6,087,954 A | 7/2000 | McSpadden et al. | |
| 6,089,284 A | 7/2000 | Kaehler et al. | |
| 6,091,817 A | 7/2000 | Bertina et al. | |
| 6,095,412 A | 8/2000 | Bertina et al. | |
| D431,039 S | 9/2000 | Wilson | |
| D431,252 S | 9/2000 | Wilson | |
| D431,573 S | 10/2000 | Wilson | |
| D432,141 S | 10/2000 | Wilson | |

| | | | |
|---|---|---|---|
| D432,548 S | 10/2000 | Wilson |
| D432,552 S | 10/2000 | Wilson |
| D433,031 S | 10/2000 | Wilson |
| D433,032 S | 10/2000 | Wilson |
| D433,033 S | 10/2000 | Wilson |
| D433,034 S | 10/2000 | Wilson |
| D433,035 S | 10/2000 | Wilson |
| D433,036 S | 10/2000 | Wilson |
| D433,037 S | 10/2000 | Wilson |
| D433,059 S | 10/2000 | Okumura et al. |
| 6,128,599 A | 10/2000 | Walker et al. |
| D433,420 S | 11/2000 | Wilson |
| D433,421 S | 11/2000 | Wilson |
| D433,422 S | 11/2000 | Wilson |
| D433,423 S | 11/2000 | Wilson |
| D433,424 S | 11/2000 | Wilson |
| D434,041 S | 11/2000 | Burke |
| 6,170,745 B1 | 1/2001 | Schilling |
| D437,882 S | 2/2001 | Creighton |
| 6,205,435 B1 | 3/2001 | Biffar |
| 6,214,155 B1 | 4/2001 | Leighton |
| 6,260,024 B1 | 7/2001 | Shkedy |
| 6,308,887 B1 | 10/2001 | Korman et al. |
| 6,318,536 B1 | 11/2001 | Korman |
| 6,334,216 B1 | 12/2001 | Barth |
| 6,441,736 B1 | 8/2002 | Leighton |
| 6,514,367 B1 | 2/2003 | Leighton |
| 6,557,766 B1 | 5/2003 | Leighton |
| D481,068 S | 10/2003 | Blossom et al. |
| 6,631,849 B2 | 10/2003 | Blossom |
| 6,687,714 B1 * | 2/2004 | Kogen et al. | 707/200 |
| 6,725,303 B1 | 4/2004 | Hoguta et al. |
| 7,131,574 B1 | 11/2006 | Sciupac et al. |
| 2001/0038033 A1 | 11/2001 | Habib |
| 2002/0026416 A1 | 2/2002 | Provinse |
| 2002/0103852 A1 * | 8/2002 | Pushka | 705/35 |
| 2002/0165821 A1 | 11/2002 | Tree |
| 2002/0167890 A2 | 11/2002 | Duroj |
| 2004/0049451 A1 | 3/2004 | Berardi |

FOREIGN PATENT DOCUMENTS

| | | | |
|---|---|---|---|
| EP | 1033688 A1 * | 9/2000 |
| WO | WO 98/37524 | 8/1998 |

OTHER PUBLICATIONS

Kantrow, Yvette D. "Social Security to Try Debit Card: Some Baltimore Payments Will Be Handled Electronically" Oct. 5, 1988, American Banker, V153 Issue 193, p. 10.*

Hansell, Saul "Deals Looming to Establish US Ventures in Cash Cards" Nov. 9, 1996, New York Times, col. 5, p. 35, Sec. 1.*

Perkins, Marietta L. "The private banking paradox" Jan. 1998, ABA Banking Journal, v90, n1, p. 41-45.*

Epper, A Player Goes After Big Bucks in Cyberspace, American Banker, vol. 160, No. 86, ISSN: 0002-7561, May 5, 1995, p. 17.

Sotto, An RFID Code of Conduct, RFID Journal, Featured Opinions, May 30, 2005.

BSI2000 Files Patent Application for Optical Bank Card Press Release, printed Apr. 27, 2004.

Brehl, Banks issue cash-card pledge, The Toronto Star, Oct. 9, 1997, 1 page.

Card Flash, Daily Paymant Card News, www.CardWeb.com, printed Aug. 10, 2004.

Rosen, Cash Just Isn't Flexible Enough: Shops of the Future Will Only Take Cards, Daily Express, Technology Section, Feb. 10, 1995, 1 page.

Hesseldahl, China Goes Smartcard Crazy, www.forbes.com, Jun. 12, 2001.

Schwartz, Digital Cash Payoff.

E-Z Pass, Web page, http://www.ezpass.com-Disc_portNewYork. html, Nov. 12, 2001.

E-Z Pass, Web page, http:\\www.ezpass.com-Disc_ny_annual. html, Nov. 12, 2001.

E-Z Pass, Web page, http:\\www.ezpass.com-frameMain.html, Nov. 12, 2001.

E-Z Pass, Web page, http:\\www.ezpass.com-whatis.html, Nov. 12, 2001.

Business Times, Electronic Purse Can Free You from ATM Drag, Business Times, www.btimes.co.za, printed Feb. 23, 2001, 1 page.

Electronic Purse, SCIA (Smart Card Industry Association), About Smart Cards, www.scia.org, printed Feb. 23, 2001, 1 page.

Sanchez-Klein, Electronic purse alliance planned, Computerworld Online News, Jul. 29, 1998, printed Feb. 23, 2001, 2 pages.

Electronic purse card to be launched tomorrow, New Straits Times, News Clippings, Sep. 18, 1999, printed Feb. 23, 2001, 3 pages.

Frequently asked questions, ECARD, www.eregard.com, printed Sep. 23, 2001, 7 pages.

Machlis, Have it the smart way: Burger King program drives smart-card use, Computerworld, printed Feb. 23, 2001, 1 page.

Nokia Announces the World's First NFC Enabled Mobile Product for Contactless Payment and Ticketing, PRNewswire, Feb. 9, 2005.

Proton world and Europay to co-operate in creation of new CEPS-compliant e-purse application, Press Release 1999, Waterloo, Belgium, Jun. 28, 1999, 2 pages.

Purse Application for Cross Border Use in Euro, Cordis, Pace 1st 1999-11531 Pace, www.cordis.lu, printed Feb. 23, 2001, 3 pages.

RFID Tags, Contactless Smart Card Technology and Electronic Passports: Frequently Asked Questions, www.smartcardalliance.org, Feb. 17, 2005.

RFID Tags, Contactless Smart Card Technology: Comparing and Contrasting Applications and Capabilities, www.smartcardalliance. org, Feb. 17, 2005.

SK100 Smart Card Electronic Purse Balance Reader, SK100 Balance Reader, http://perso.wanadoo.fr, printed Feb. 23, 2001, 1 page.

Gilhooly, Smart Cards, Smart Move?, Computerworld, May 21, 2001, pp. 1-5.

Smart card for loyalty and e-purse applications eclipses capability of conventional mag-stripe cards, Press Release, www.1.sib.com, Apr. 21, 1997, printed Feb. 23, 2001, 3 pages.

SmartAxis: Load Cash on to your E-Purse Card, Supported Currencies and Schemes, www.smartaxis.co.uk, printed Feb. 23, 2001, 9 pages.

Dvorak, Smartcards Get Smarter, www.forbes.com, Jun. 1, 2001.

Hesseldahl, Stock Focus: Smartcard Companies, www.forbes.com, Jun. 18, 2001.

The Electronic Purse Reaches the Car Park, http:\\docs.vircom.net/mobility/parking, printed Feb. 23, 2001, 2 pages.

Stuber, The electronic purse: An overview of recent development and issues, Bank of Canada, Technical Report No. 74, www.bankofcanada.ca, Jan. 1996, printed Feb. 23, 2001, 2 pages.

Transponders: Cash In A Flash, www.forbes.com, Jul. 31, 2001.

Hesseldahl, U.S. Getting Wise To Smart Cards, Forbes.com, May 25, 2000.

Understanding the benefits: Smartcity offers a number of important benefits to both the card issuers and their customers, www://www.icl.com/smartcards/benefits.htm, printed Feb. 27, 2001, 2 pages.

Visa first to launch electronic purse load via GSM mobile phone, www.cellular.co.za, Johannesburg, ZA, printed Feb. 23, 2001, 4 pages.

Hansell, Visa to unveil electronic purse cards, New York Times, printed Feb. 23, 2001, 2 pages.

Visa, MBNA and De La Rue Launch Multi-Function Smart Card Program, www.findarticles.com, Jul. 6, 1998.

Machlis et al., Will smart cards replace ATMS?, Computerworld, printed Feb. 23, 2001, 3 pages.

* cited by examiner

FINANCIAL SYSTEM FOR ISOLATED ECONOMIC ENVIRONMENT

CROSS REFERENCE TO RELATED APPLICATIONS

This application claims priority to U.S. Provisional Application No. 60/362,746, filed on Mar. 8, 2002, the entirety of which is incorporated herein by reference.

FIELD OF THE INVENTION

The present invention generally relates to a method and system for conducting financial transactions, and more specifically to a method and system for conducting financial transactions in isolated economic environments, such as ships at sea.

BACKGROUND OF THE INVENTION

Various types of methods and systems for conducting financial transactions exist in the prior art.

EP 1033688A1 (the "EP '688 Application") discloses a method and system for managing transactions, which provides distributed services for use of a transaction card, such as a smart card, on board a ship when shipboard communications with a centralized host system are not available. The data representing current transaction information for the transaction cards of the ship personnel is stored in the distributed card management system database, and at regular intervals, when ship-to-shore communication is available, the land-based and shipboard databases are synchronized.

U.S. Pat. No. Re. 36,788 discloses a method of transferring funds from a first financial institution to a second financial institution using smart cards. The method includes linking a smart card to a first financial institution, debiting an account at the first financial institution and recording a corresponding credit value on the smart card. The credit can then be transferred to other smart cards, which in turn transfer their credit value to a second financial institution.

U.S. Pat. No. 6,105,008 discloses a system and architecture used to load a credit value on a smart card from a bank account, which can then be used to pay for goods and services purchased from merchants on-line using the Internet. The purchases are made using credit values stored on the smart card. The merchants receive payment from the bank account by way of information from a payment server.

U.S. Pat. No. 6,289,324 discloses a system for performing financial transactions using a smart card. The smart card has an electronic purse feature that is readable and modifiable as required by an external terminal. A preset value is stored on the smart card. As transactions occur, the stored value is reduced. Additionally, other functions can be authorized using the smart card such as stock transactions and find transfers between accounts.

A review of the prior art shows that none of the references disclose a system utilizing a unitary account structure that allows financial transactions to occur in isolated economic environments based on actual and anticipatory funding.

SUMMARY OF INVENTION

The present invention is a system and method for conducting financial transactions in an isolated economic environment, such as on a ship at sea. The system of the present invention includes a self-sufficient financial account system in the isolated economic environment. The account system has asynchronous connections to various financial networks by which it is able to conduct financial transactions even though it is out of contact with the financial networks for extended periods of time (e.g., several weeks). When in contact with the financial networks, the self-sufficient account environment synchronizes accounts on opposite sides of the asynchronous link. Significantly, the present system allows anticipatory funding of account holders' accounts using provisional credits tied to known dates of direct deposits, requested but executed ACH transfers, and requests for credit card transfers. Using these mechanisms, the self-sufficient isolated account environment is able to provide the users access to funds which would otherwise be unavailable at the remote isolated location for extended periods. The present invention further includes a debit card that also includes a smart card chip. The debit feature of the card is accessed using a magnetic stripe embossed on the card. The smart card chip creates a secure customized "E-purse" which stores virtual cash. This virtual cash is accessed using smart card devices located in the isolated economic environment.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

The present invention relates to a financial system in an isolated environment such as onboard a ship. In one embodiment of the present invention, the system utilizes a smart card that has both a magnetic strip and smart chip. The card functions as a normal ATM credit/debit card as well as stored value card. The magnetic stripe acts a traditional debit/credit card while the smart chip stores funds. The funds stored in the smart chip stores can be transferred to it from demand deposit accounts (DDAs), checks, and credits. Anticipated funding events such as an upcoming payroll check are used to fund the DDA that is then used to fund the smart chip.

The financial system has an open transaction platform that allows users to carry out secure transactions on any wired or wireless device, at any time and from anywhere. Transactions are initiated by the smartcard that provides user identification, authentication, authorization, multiple payment functionality, and the secure transmission of information.

Various functions can be performed using the smart card such as depositing funds to the chip from a check or cash, transferring funds from the chip to cash, transferring store credit to the chip, or transferring funds from the chip to store credits. Additionally funds are transferable between chips of different smart cards.

Figure 1:
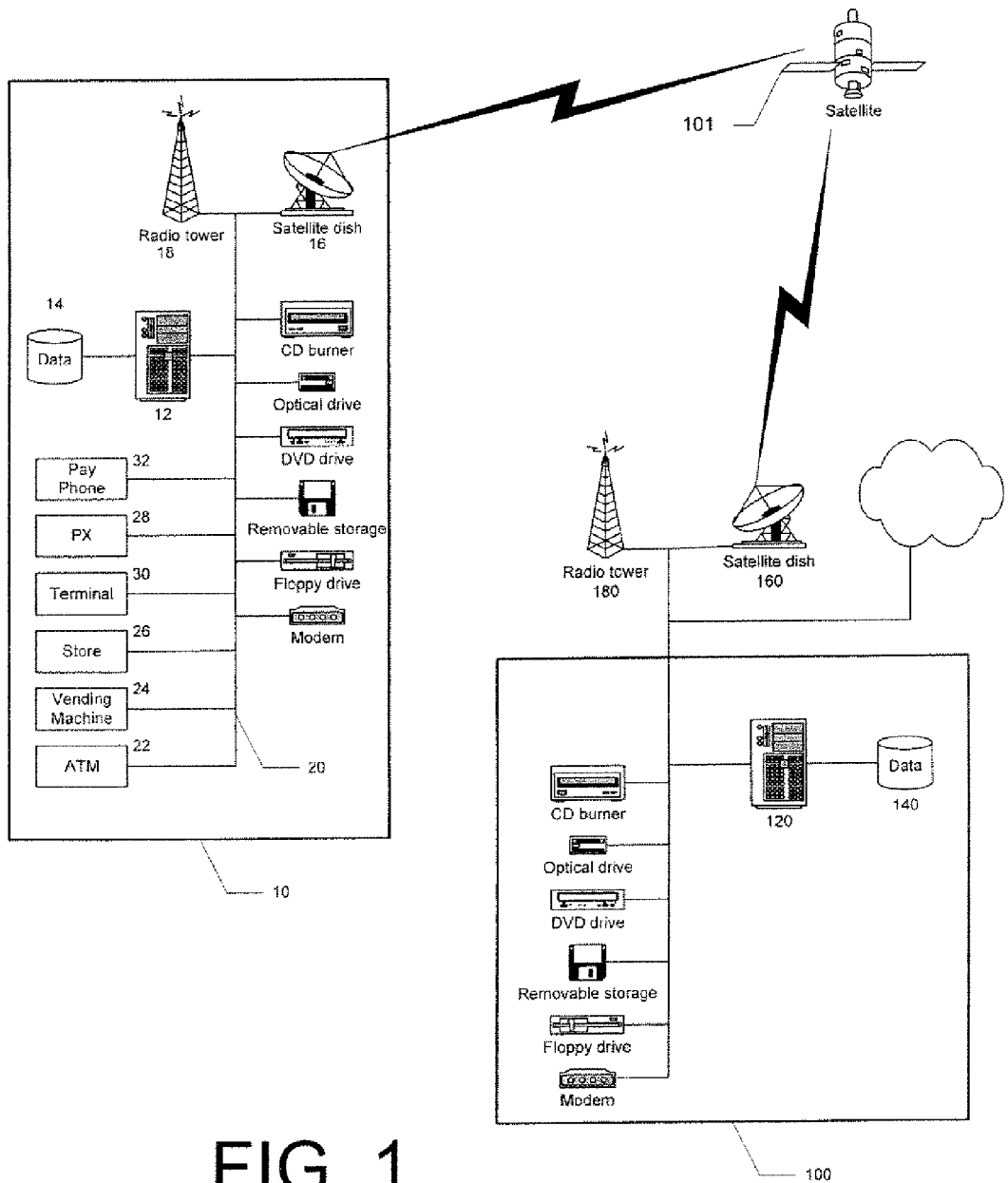
FIG. 1 is an overview of one embodiment of the system according to the present invention.

As shown in FIG. 1, there are two (2) databases, a first database 14 that is in the isolated environment 10, and a second database 140 that is in a non-isolated environment 100. The isolated environment 10 is for example a ship, or any other environment where financial transactions take place that may be out of communication with the non-isolated environment 100. The non-isolated environment 100 is, in this example, a an account system in bank on the shore.

The isolated database 14 contains customer accounts, transaction records regarding the accounts, transmission information, and the like. The data in database 14 also includes information regarding each individual card and smart chip, such as information related to the amount of cash stored on a smart card in the isolated environment. Thus, if a card is lost or stolen the card can be replaced and the remaining balance of stored value can be transferred to the new card. In one embodiment of the invention, balances are maintained only in the non-isolated, shore based database 140. Thus, if a card is lost or stolen the funds can only be replaced when database 140 is accessed.

Database 14 also stores data from network 20. Network 20 contains such elements as an ATM 22, vending machines 24, stores 26, PX 28, terminal 30, and the like. As a card is used at any of the locations connected to network 20, whether it be a debit transaction, a credit transaction or a smart chip transaction, the transaction is recorded in database 14.

Whenever possible, database 14 and database 140 are synchronized. That is to say, isolated database 14 and non-isolated database 140 are mirror images of each other to every extent possible. Database 140 is preferably part of a banking system that is not in an isolated environment. The two databases 14 and 140 are synchronized with updates using various communication means. The databases 14, 140 can be connected to each other via various electronic transmission means such as the internet, radio, satellite (e.g., 101), modem, and the like. Additionally, if electronic transmission means are unavailable, synchronization takes place using updates on paper records, magnetic discs, magnetic tapes, CDs, or the like. The updates are the result of a batch process that summarizes transactions and provides a summary that is used to update and synchronize the accounts in databases 14, 140.

The shore database 140 is understood to be the "home" of the account information, however, both databases 14 and 140 maintain records of the account information. The ship database 14 is synchronized with the data on the home database 140. In a preferred embodiment the shore side data is pulled to the ship database 14, not pushed from the shore database 140. Further, the data from the shore database 140 is extracted on a regular basis when communication is possible. When a ship goes into blackout mode, i.e., is in an isolated economic environment, where no communications are permitted, the ship-side batch process creates at most one synchronization file for transmission to the shore database 140 and then continues to record the start and end times for synchronization files in the database 14. Additionally, the ship side batch process continues to attempt communication with the shore-side database periodically until it can continue to attempt communication with the shore-side database periodically until it can continue transmitting and receiving files. In another embodiment, the ship side batch process continues to prepare new update files which are placed in a repository for the shore-side process to retrieve when communication is reestablished with the ship.

The process generates error logs in report form to notify an operator if transmission or database integrity errors prohibit the processing of an update. Alerts may be implemented using email or console type alerts.

An account/card holder, i.e., a user, is able to perform many tasks in the isolated environment using the terminals 30 or ATM's 22 connected to network 20. A user is able to transfer funds from an account to the chip. The account is debited and the card chip is credited the transfer amount. A transaction table in database 14 maintains a record of completed transactions and a transaction log records the transaction. Thus, when the ship-side database 14 and land based database 140 are synchronized, the account from which funds were debited is updated. Alternately, the user can transfer funds from the chip to one or more of the user's accounts. Funds can also be transferred from the representation of the account, the ship account, to a DDA account or from a DDA account to the ship account. The transaction log has records of the complete transaction as well as the transaction table.

The system also allows chip-to-chip fund transfers. The first user's chip is debited the transfer amount and the second user's chip is credited the transfer amount. Transaction logs and tables record the transaction. To transfer funds the first user inserts the card into the ATM and enters a PIN number. The user then requests a chip-to-chip transfer. The ATM or terminal verifies the funds on the chip and withdraws those funds requested to be transferred from the chip. The funds are then deposited in an escrow account. The ATM prompts insertion of the second user's card into the ATM or terminal. User two then enters a PIN number and the system verifies the funds in the escrow account and transfers those funds to the second users chip.

In a similar manner, vending machines and store purchases can be made using the smart card. The user can choose whether the transaction is processed using the magnetic stripe as a credit/debit card, or from stored value maintained on the smart card chip. It should be noted that any transfer would, in a preferred mode, be processed through an escrow account.

The user can fund the stored value in a smart chip in a variety of ways. The user can perform funding at a smart card enabled ATM. The user inserts the smart card in a smart card enabled ATM or slides the smart card in a reader. The user is then prompted to enter a PIN number that is verified. The user is then prompted to select a transaction. When funding is selected, the user chooses the source for the funds to be transferred. The sources available depend on the user but are selected from DDAs, other deposit accounts, credit accounts, or other users. The user then enters an amount to be transferred to the smart card. The system transfers the funds if they are available.

The ship account and the shore account are the same account. Where communication is possible, both the ship account and the shore account are periodically synchronized. When the ship is out of communication, user's can add funds up to the balance of their accounts at the last synchronization. If the funds are no longer available when communications are restored, the account is overdrawn.

Funding of the user's account from anticipated events form a significant part of the present invention. Anticipated funding events are events such as upcoming payroll, requested but unexecuted transfers, requested but unexecuted reimbursements, and the like. The isolated system 10 is capable of crediting a user's account with an anticipated funding amount, e.g., their direct deposits payroll account, even while the ship is out of communication with the home account. In essence, the isolated system 10 is performing synchronization of the account representation in databases 14 and 140 even though the isolated system 10 is not in communication with the non-isolated "home" system 100. On the date that the actual funds are deposited in the user's "home" account in database 140 in system 100, the remote isolated system 10 credits the user's account in database 14. The amount of the anticipated funding is equal to the most recent payroll amount in the most recent payroll cycle. This anticipatory funding allows a user to access funds that would normally be unavailable. When the ship communicates with the shore financial institution, the account is reconciled using the updates as previously described.

The isolated system 10 and the non-isolated system 100 are each complete financial systems. Thus, the systems 10 and 100 are able to track funds in the ship safe, i.e., maintain an accurate balance of all cash held on the ship, perform automated end month processing, and perform automated settlement of funds with merchants. Further, the system has the ability to report the cash position of the entire fleet, sub-fleet, individual ship, and individual type of ship.

The self-sufficient banking environment 10 is able to function in an environment where there are multi-week communication blackouts from a financial network. The self sufficient banking environment and 10 the non-isolated financial network 100 are capable of synchronizing each user's account upon establishment of a communication link between the two systems. The synchronization of the user's account includes reconciling actual transactions and anticipatory funding events. The anticipatory funding events are related to known dates of direct-deposit pay, requested ACH transfers that are unexecuted, credit card transfers, and funding with uncleared checks.

The ability to transfer funds to the chip eliminates the need to have large amounts of cash available. Thus, the risk of theft in closed environments is reduced. Further, the risk of loss is eliminated. If a user were to lose cash, assuming in a ship environment that the money is lost overboard, the cash cannot be replaced. However, in the present system, each transaction is recorded. Thus, if a smartcard is lost, the remaining cash value can be determined.

Figure 2:
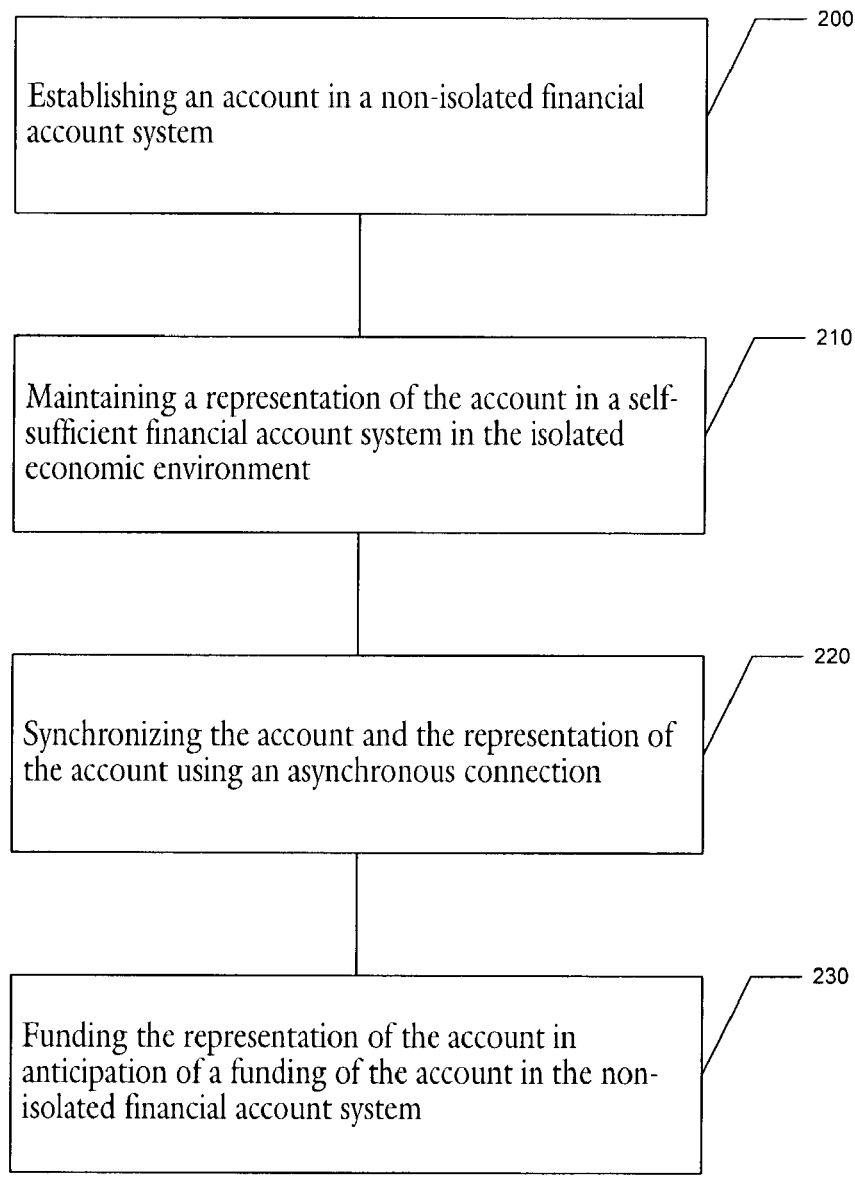
FIG. 2 is an overview of one embodiment of the method according to the present invention.

As shown in FIG. 2, initially, a user establishes an account in a non-isolated financial account system. (200). The non-isolated financial account system is, in one embodiment, shore based. A representation of the account is maintained in a self-sufficient financial account system in an isolated economic environment such as a ship. (210). The account and the representation of the account are synchronized using an asynchronous connection. (220). The representation of the account is funded in anticipation of a funding event in the non-isolated financial account system when the asynchronous connection is not available. (230).

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A system for conducting financial transactions in an isolated economic environment, comprising:
   a non-isolated electronic financial account system based in a non-isolated environment, the non-isolated electronic financial account system comprising a first database storing information reflecting a customer account;
   a self-sufficient electronic financial account system in the isolated economic environment, wherein the self-sufficient electronic financial account system comprises a second database that maintains a representation of the customer account; and
   an asynchronous connection between the non-isolated electronic financial account system and the self-sufficient electronic financial account system, wherein the non-isolated electronic financial account system and the self-sufficient electronic financial account system synchronize the account and the representation of the account using the asynchronous connection, and wherein the self-sufficient electronic financial account system funds the representation of the account in anticipation of a funding of the account in the non-isolated electronic financial account system when the asynchronous connection is not available.

2. The system of claim 1 for conduction financial transactions in an isolated economic environment, further comprising:
   a debit card including a smart card chip and a magnetic stripe embedded on the debit card.

3. The system of claim 2 wherein the debit card further comprises a stored value card.

4. The system of claim 1 wherein the isolated economic environment comprises a ship.

5. The system of claim 1 wherein the self sufficient electronic financial account system comprises an ATM machine configured to provide a chip-to-chip fund transfer.

6. The system of claim 1, wherein the funding of the account in the non-isolated electronic financial account system comprises a transaction selected from the group consisting of: a direct deposit payroll transaction, a requested but unexecuted transfer, a funding with an uncleared check, a credit card transfer, and a requested but unexecuted reimbursement.

7. A method for conducting financial transactions in an isolated economic environment, comprising:
   storing a first representation of an account in a first database in a non-isolated electronic financial account system, wherein the non-isolated electronic financial account system is based in a non-isolated environment;
   storing a second representation of the account in a second database in a self-sufficient electronic financial account system, wherein the self-sufficient electronic financial account system is in the isolated economic environment;
   synchronizing the first representation of the account and the second representation of the account using an asynchronous connection; and
   funding the second representation of the account in anticipation of a funding of the first representation of the account in the non-isolated electronic financial account system when the asynchronous connection is not available.

8. The method of claim 7 further comprising providing a debit card including a smart card chip and a magnetic stripe embedded on the debit card.

9. The system of claim 8 wherein the debit card further comprises a stored value card.

10. The method of claim 7 wherein the isolated economic environment comprises a ship.

11. The method of claim 7 wherein the self-sufficient electronic financial account system comprises an ATM machine configured to provide a chip-to-chip fund transfer.

12. The method of claim 7, wherein the funding of the first representation of the account in the non-isolated electronic financial account system comprises a transaction selected from the group consisting of: a direct deposit payroll transaction, a requested but unexecuted transfer, a funding with an uncleared check, a credit card transfer, and a requested but unexecuted reimbursement.

* * * * *

UNITED STATES PATENT AND TRADEMARK OFFICE
CERTIFICATE OF CORRECTION

PATENT NO.       : 7,593,875 B2
APPLICATION NO.  : 10/386218
DATED            : September 22, 2009
INVENTOR(S)      : Granite et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1679 days.

Signed and Sealed this

Twenty-eighth Day of September, 2010

David J. Kappos
*Director of the United States Patent and Trademark Office*